United States Patent [19]

Monnet

[11] Patent Number: 4,497,763
[45] Date of Patent: Feb. 5, 1985

[54] METHOD FOR INJECTION MOULDING COATED PARTS FROM PLASTICS MATERIAL

[75] Inventor: Bernard Monnet, Bellignat, France

[73] Assignee: Pont-A-Mousson S.A., Nancy, France

[21] Appl. No.: 279,380

[22] Filed: Jul. 1, 1981

[30] Foreign Application Priority Data

Jul. 21, 1980 [FR] France ................................ 80 16085

[51] Int. Cl.³ .......................... B29C 5/08; B29D 9/00; B29F 1/00
[52] U.S. Cl. ................................... 264/255; 264/328.8
[58] Field of Search ...................... 264/45.1, 255, 46.5, 264/328.8; 425/4 C, 817 R

[56] References Cited

U.S. PATENT DOCUMENTS

| 3,531,553 | 9/1970 | Bodkins ....................... 264/DIG. 83 |
| 3,846,223 | 11/1974 | Lederman et al. ................... 264/255 |
| 3,966,372 | 6/1976 | Yasuike et al. ...................... 264/45.1 |
| 4,014,966 | 3/1977 | Hanning ............................. 264/45.1 |
| 4,035,466 | 7/1977 | Lanecker ............................ 264/45.1 |
| 4,115,491 | 9/1978 | Hanning ............................. 264/45.1 |
| 4,140,672 | 2/1979 | Kataoka ............................. 264/45.1 |
| 4,155,969 | 5/1979 | Hendry .............................. 264/45.1 |
| 4,201,742 | 5/1980 | Hendry .............................. 264/46.5 |
| 4,247,515 | 1/1981 | Olabisi .............................. 264/45.1 |

FOREIGN PATENT DOCUMENTS

| 1219097 | 1/1971 | United Kingdom ............... 425/4 R |
| 1339445 | 11/1971 | United Kingdom ............... 264/45.1 |

OTHER PUBLICATIONS

Bernhardt, "Processing of Thermoplastic Materials".

Primary Examiner—Willard E. Hoag
Attorney, Agent, or Firm—Sughrue, Mion, Zinn, Macpeak & Seas

[57] ABSTRACT

In order to injection mould smooth walled parts from plastics material containing a filler or cellular material a liquid coating material of low viscosity is introduced into the mould by means of the injected plastics material. Under the pushing action of the injected material, the coating material is deposited in the form of a thin film on the walls of the mould. The injection of the plastics material is effected from the lower part of the mould, so that the coating material rises progressively in the mould with the injected material.

2 Claims, 2 Drawing Figures

U.S. Patent     Feb. 5, 1985     4,497,763
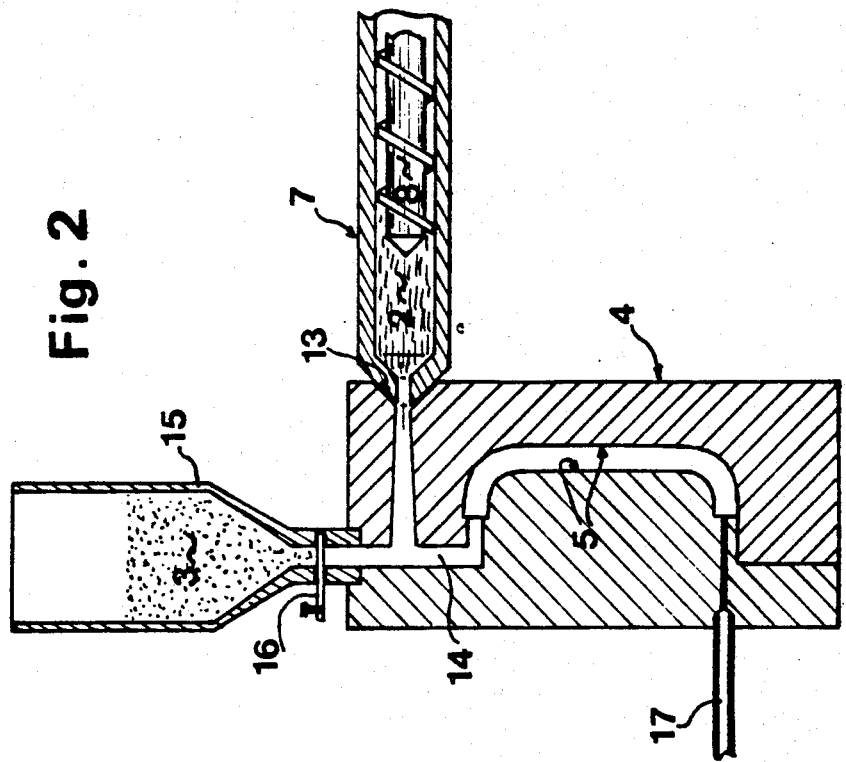
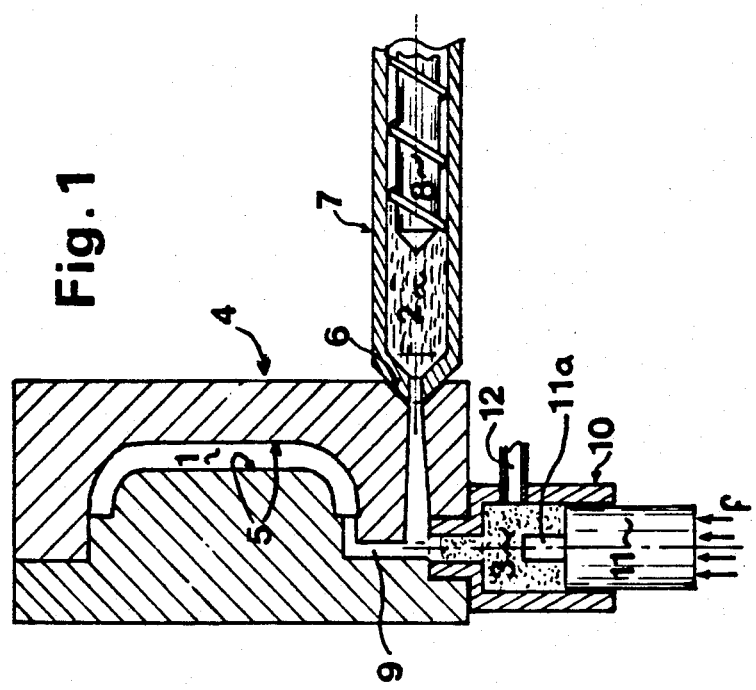

METHOD FOR INJECTION MOULDING COATED PARTS FROM PLASTICS MATERIAL

The present invention relates to a method for the injection moulding of coated parts from plastics material and, in particular, of parts based on thermoplastic or thermosetting plastics material containing a filler or having a non-smooth external structure. It also relates to the apparatus intended for carrying out this method.

It is known to manufacture thin parts from thermosetting plastics material containing a filler, for example glass fibres, by moulding a flat sheet of this plastics material containing a filler. Due to this method of manufacture, the part formed in this way has neither a smooth surface, nor a good appearance, owing to the presence of the filler material. In order to remedy this poor surface condition, it is generally provided, after moulding of the sheet, to coat the latter with resin not comprising a filler, then to ensure further compression in the mould in order to ensure the correct dimensions of the finished part as well as polymerization of this coating resin not comprising a filler. The moulded part formed in this way has smooth surfaces where the filler material is no longer apparent. This method has numerous drawbacks. In fact, on the one hand, the moulding time is long, since the mould must be opened in order to facilitate coating of the surfaces of the part with the coating material and, on the other hand, since polymerization of the material containing a filler and of the coating material are effected separately, there is only a mediocre bond between the two polymerized materials.

It is also known to produce parts from thermoplastic material comprising two materials, one forming the centre of the part and which may comprise a filler or cellular material (foam) and one forming the exterior of the part in order to give the finished part the correct appearance. The manufacture of such parts is generally carried out by injecting the material forming the exterior of the part into the mould then by injecting the material forming the centre of the part. Parts of this type are produced from materials which, whilst being hot at the time of the injection, still have viscosities of several hundred to several million poises, so that, in order to have a good distribution of the external material, first of all the material intended to form the exterior of the part then the material forming the centre is injected at the centre of the plane of the part to be moulded or in its vicinity. On account of the high viscosity of the two materials, it is not possible to produce thin parts, since the thickness of the external material should not be less than approximately 1 millimeter on average. In addition, the injection of the two materials and, in particular the external material, necessitates the use of a considerable injection force.

The present invention intends to remedy these drawbacks and relates to a method for injection moulding of coated parts from plastics material of the type in which a plastics material is injected into a mould, characterised in that a coating material of low viscosity is introduced into the mould by means of the injected material.

Owing to this method, since the injected material has a much higher viscosity than the coating material, a thin coating film is produced around the injected material. Polymerization of the two materials thus takes place at the same time.

Another feature of the invention resides in the fact that the coating material is pushed into the mould by the injected material.

Thus, a good distribution of the coating material in the mould is achieved.

An apparatus for carrying out the method according to the present invention of the type comprising a mould for the injection of the part to be manufactured and a device for injecting a plastics material is characterised in that a device for introducing the coating material opens into the channel supplying the injected material between the injection device and the mould.

This apparatus makes it possible to ensure the introduction into the mould of the coating material by the injected material.

Another feature of the apparatus according to the invention resides in the fact that the channel for supplying material opens into the mould, in the lower part of the moulding impression.

Thus, due to gravity, the coating material remains in contact with the ascending face of the material injected into the mould.

Further features and advantages will become apparent from the ensuing description.

In the accompanying drawings, given solely by way of example:

FIG. 1 is a diagrammatic view of an injection moulding apparatus according to the invention;

FIG. 2 is a diagrammatic view of a variation of an injection moulding apparatus according to the invention.

The method according to the invention, of which an example of the apparatus intended for carrying it out is illustrated in FIG. 1, may be used for the production of a thin part 1 from plastics material 2 containing a filler, provided with a coating 3, the coated part being obtained directly in an injection mould 4 comprising a moulding impression 5 for the plastics material containing a filler. The plastics material forming the part may be formed by a thermosetting resin, for example a polyester resin, containing a powdered filler material such as for example calcium carbonate and a reinforcing filler material such as for example glass fibres.

The coating material may be a paint in a liquid form or a liquid thermosetting resin having a viscosity at ambient temperature less than 100 poises.

First of all, this method consists of introducing the coating material of low viscosity into the lower part of the mould between the moulding impression 5 and an orifice 6 for injecting the plastics material comprising a filler, itself situated below the moulding impression, then of injecting the material forming the part through the injection orifice 6 by means of an injection device 7 comprising a worm.

Under the effect of its weight (force of gravity), when the plastics material comprising a filler is injected into the impression 5, the plastics material comes into contact with the coating material and pushes it into the impression thus creating a thin coating film between the mould and the injected material. This thin film is created owing to the low viscosity of the coating material with respect to that of the injected material.

In fact, in this type of injected part, a liquid coating material generally has a viscosity less than 100 poises, whereas at the outlet temperature of the injection device 7, the injected material forming the part has a much higher viscosity which may be of the order of several thousand to several million poises.

This method makes it possible to obtain a part having good surface condition, since all the injected material comprising a filler is coated with the coating material not containing any filler. The distribution of the material is always correctly effected, since it is the homogeneous injected material which itself ensures this distribution.

In addition, since the coating material is introduced into the mould at the same time as the injected material, these two materials are polymerized together in the mould so that there is a good bond between these two materials in the finished part.

Furthermore, this coating material also facilitates better injection of the injected material, since on account of its low viscosity, this coating material acts as a lubricant on the wall of the mould with regard to this injected material.

This method also makes it possible to obtain parts in which all the faces are coated, whereas certain known methods do not permit this. In addition, since the coating of the part is effected at the same time as the injection of the part, the manufacturing times for such parts are much less than those of known methods.

A variation of this method according to the invention consists of introducing the coating material by gravity into the upper part of the mould between the moulding impression and the orifice for the injection of the material forming the part, which is also situated above the impression and of subjecting the moulding impression to the pressure of a fluid, gas or liquid, in order to keep the coating material in this upper part until, under the effect of the injected material, this fluid is progressively expelled from the impression. In this variation, the force of gravity which kept the coating material in contact with the injected material in the method previously described is replaced by the force created by this pressurized fluid.

In the case where the parts to be produced are very thin and/or the injected material has a high viscosity, it is also possible to provide partial opening of the mould at the time of the injection of the material, then to reclose the latter in order to obtain the parts with their final shapes and dimensions.

An apparatus for carrying out the afore-described method is illustrated in FIG. 1 and comprises an injection mould 4 comprising an impression 5 of the shape of the part to be obtained, an injection orifice 6, into which an injection device 7 comprising a worm 8 opens and which is connected to the impression 5 by a conduit 9.

Opening into this conduit 9 is an introduction device 10 forming a container for supplying coating material and comprising a piston 11 intended to introduce this material into this conduit 9 and an orifice 12 for supplying this material into the introduction device 10.

By means of this apparatus, with the mould 4 comprising the impression 5 closed and the injection device 7 in contact with the mould by its injection orifice 6, the coating material is introduced into the conduit 9 by pushing the piston 11 in the direction of arrows f and at the end of the introduction, the protuberance 11a of the piston closing off the orifice connecting the introduction device 10 to the conduit 9. By means of the injection device 7, the material extruded by the worm 8 is pushed into the conduit 9 then into the impression 5 of the mould. The coating material is thus pushed into the conduit 9 and into the impression by the injected material. Under the pushing action of this injected material, the coating material rises with the latter in the impression, thus leaving a thin film along the wall of the mould. The two materials thus polymerize together in the mould.

This apparatus has the advantage of being simple, inexpensive and of facilitating rapid manufacture of a coated part by injection moulding.

A variation of the apparatus according to the invention consists in that an injection orifice 13 for the injected material is situated above the impression and is connected to the moulding impression 5 by a conduit 14. Opening into this conduit 14 is the lower end of a hopper 15 forming a device for introducing the coating material and which is provided in its lower part with a stopcock 16. A conduit 17 for supplying pressurized fluid to the impression 5 is connected to the lower part of this impression.

By means of this variation of the apparatus, when the impression 5 is pressurized by means of the conduit 17, the stopcock 16 is opened so that a certain quantity of coating material contained in the hopper 15 is introduced into the conduit 14. Then the material of the part to be produced is injected into this conduit by the injection device 7, in contact with the orifice 13 of the mould, which thus pushes the coating material into the mould against the pressure of the fluid so that this coating material remains in contact with the injected material and is deposited in the form of a thin film along the wall of the mould.

This method according to the invention and the apparatus for carrying it out make it possible to produce injected parts coated with a thin coating layer in a simple manner. It is thus possible to obtain either parts of thermoplastic material with a coating also of thermoplastic material, hardening of the part being obtained by cooling of the mould, or parts of thermosetting material with a coating also of thermosetting material, polymerization of these materials being obtained by heating of the mould.

Although, in the examples described above, the plastics material injected is a plastics material comprising a filler, the invention can be applied to the manufacture of parts from any plastics material (comprising fillers, cellular materials etc.,) for which a coating is desired, whether this coating is in order to obtain a good surface condition or a particular coloration.

I claim:

1. A method for the injection molding of coated parts from plastics material wherein a plastics material is injected into a mold cavity comprising introducing a charge of liquid coating material having a relatively low viscosity through an orifice into a conduit connected to the bottom of a mold cavity and closing said orifice, then injecting a plastics material having a viscosity much greater than the viscosity of the liquid coating material into said conduit at a point in said conduit below said coating material such that the injection of said plastics material into the mold cavity forces the liquid coating material upwardly into the mold cavity ahead of said plastics material, the liquid coating material being maintained in contact with said plastics material by means of gravity and rising in the cavity with the plastics material so that the well of the cavity will be uniformly coated with a thin film of said coating material.

2. A method as set forth in claim 1 wherein said coating material has a viscosity less than 100 poises at ambient temperature and said plastics material has a viscosity of at least several thousand poises.

* * * * *